United States Patent [19]

McGowan et al.

[11] Patent Number: 4,660,183
[45] Date of Patent: Apr. 21, 1987

[54] VIBRATION ISOLATION MODULE FOR SONAR TOWED ARRAYS

[75] Inventors: George A. McGowan, Westminster, Calif.; David B. MacCulloch, Panama City, Fla.

[73] Assignee: Hughes Aircraft Company, Los Angeles, Calif.

[21] Appl. No.: 910,359

[22] Filed: Sep. 22, 1986

Related U.S. Application Data

[63] Continuation of Ser. No. 774,506, Sep. 10, 1985, abandoned.

[51] Int. Cl.⁴ .......................... G01V 1/38; H04R 1/44
[52] U.S. Cl. ........................................ 367/15; 367/20; 367/130; 367/154
[58] Field of Search ................. 367/15, 20, 106, 130, 367/131, 154, 177, 191; 181/110; 174/101.5

[56] References Cited

U.S. PATENT DOCUMENTS

| | | | |
|---|---|---|---|
| 3,304,364 | 1/1965 | Hetherington | 174/101.5 |
| 3,319,734 | 5/1967 | Pavey | 367/154 |
| 3,369,216 | 11/1963 | Loper | 340/7 |
| 3,441,902 | 4/1968 | Savit | 340/7 |
| 3,518,677 | 6/1970 | Florian | 367/154 |
| 3,710,006 | 1/1973 | Davis | 174/101.5 |
| 3,893,065 | 7/1975 | Lea et al. | 340/8 MM |
| 3,930,254 | 12/1975 | Pavey, Jr. | 340/7 R |
| 3,964,424 | 6/1976 | Hagemann | 114/235 B |
| 4,090,168 | 5/1978 | Miller et al. | 340/3 T |
| 4,117,447 | 9/1978 | Gould et al. | 367/106 X |
| 4,160,229 | 7/1979 | McGough | 340/7 R |

Primary Examiner—Charles T. Jordan
Assistant Examiner—John W. Eldred
Attorney, Agent, or Firm—Thomas A. Runk; Anthony W. Karambelas

[57] ABSTRACT

A technique for a vibration isolation module (VIM) used for towed arrays is disclosed. The VIM has a stretchable cable on which is mounted one or more rigid spacers which make contact with an outer hose formed of a flexible material having a selected vibration attenuation characteristic. The spacer transmits energy between the parts of the VIM which contact the spacer for attenuation purposes. The spacer is "soft mounted" on the stretchable cable so that it may be moved by a limited amount along the cable in response to forces of a specified minimum magnitude. This ability to move allows adjustment of the internal parts of the VIM during use to avoid concentrating stress at any one particular contacting area. Disclosed is an embodiment where two sleeves are used to abut the spacer at opposing ends thereof. The sleeves are clamped to the stretchable cable with a limited clamping force such that they remain stationary until the spacer is exposed to the predetermined breakaway force and/or the stretchable cable cross-sectional size decreases by a predetermined amount.

25 Claims, 4 Drawing Figures

VIBRATION ISOLATION MODULE FOR SONAR TOWED ARRAYS

The Government has rights to this invention pursuant to contract No. N00024-80-C-6347 awarded by the Department of the Navy.

This application is a continuation of application Ser. No. 774,506, filed Sept. 10, 1985, now abandoned.

BACKGROUND OF THE INVENTION

The invention relates generally to towed arrays and more particularly, to vibration isolation modules.

Towing a sensor or an array of sensors through a body of water by a surface or a submerged vessel is a procedure useful for many information gathering operations. However, various environmental and operational factors associated with the towing operation tend to degrade sensor performance by adding to the noise level impacting the sensor. Such factors include noise produced by the motion of the sensor in the water, noise caused by the turbulent flow of water around the towing mechanism, strumming noise along the towing cable, noise from the towing vessel transmitted along the towing cable, and the hydrodynamic whip-like action on the sensor when turning. Some noise takes the form of standing wave energy or vibration energy on the towing cable. A technique used for dissipating this vibration energy involves mounting a vibration isolation module between the array and the tow cable. One type of vibration isolation module has a stretchable cable connected between the sensor and the tow cable to resiliently bear the load. Enclosing the stretchable cable is an outer hose which is also stretchable. Mounted on the stretchable cable and in contact with the outer hose is a spacer formed of a rigid material for transmitting vibration energy. In the case of vibration energy on the outer hose such as that caused by water flow, the spacer will transmit that energy to the stretchable cable for dissipation. In the case of vibration energy on the stretchable cable such as from the towing vessel propagating along the cable the spacer will transmit that energy to the outer hose for dissipation.

A prior technique for mounting the spacer consisted of "hard mounting" it on the stretchable cable. One problem with a vibration isolation module (VIM) constructed in accordance with this technique has been its inability to manage uneven stresses or nonuniform loading imparted to the various components of the VIM during the towing operation. When the load on the VIM is increased such as by increasing the towing speed, certain parts of the VIM may receive different stresses. For example, the outer hose tends to "bag" at the rear due to the drag. Since the parts are in contact with each other, these different stresses can cause failure when the parts are not free to move in relation to each other. For example, where the rigid spacer is hard mounted to the stretchable cable by inserting a pin through both, the spacer is severely restricted in movement in relation to the cable. When the outer hose, which may also contact the spacer, receives a stress different from that on the cable, it will attempt to move the spacer in relation to the hose. This stress is concentrated at the area where the pin is inserted through the cable and has been the cause of failures of the stretchable cable in the past.

Accordingly, it is an object of the invention to provide a vibration isolation module which can better manage the stresses imposed by underwater towing.

Another object of the invention is to provide a vibration isolation module which is constructed so as to allow a certain amount of relative movement between certain of its component parts.

SUMMARY OF THE INVENTION

The foregoing objects and other objects are attained by the invention wherein there is provided a vibration isolation module (VIM) having one or more spacers "soft mounted" on a stretchable towing cable and in contact with a stretchable outer hose which longitudinally encloses the stretchable cable. The spacers can move along the stretchable cable by a limited amount when they are subjected to a longitudinal force of a predetermined magnitude and when the cable cross section has been decreased to a predetermined size due to stretching. The spacer is formed of a rigid material and is used to transmit energy from the stretchable towing cable to the outer hose and vice versa. The material of the outer hose is flexible and is chosen for its vibration attenuation characteristics as well as being inert to a buoyancy fluid typically filling the VIM as is the spacer. Thus, in addition to other functions, the spacer transmits fluid borne energy, and maintains a particular spacing between the stretchable cable and the outer hose.

The VIM also includes a rigid backup cable or cables which form the link between the towing cable and the towed object when the stretchable cable has been stretched to a certain limit or has failed. The spacer is also in contact with these rigid cables and supports them and spaces them from each other and other cables such as the electrical wires traversing the VIM. When the rigid cables are engaged to bear the load of the towed object, they will tend to position the spacers to accommodate their lengths. This may require a restricted amount of movement of the spacers along the stretchable cable. In accordance with the invention, movement of the spacers in response to forces such as those exerted by the rigid cables is possible.

In a prior hard mounting technique where the spacer is fixed in position on the stretchable cable, such as by being pinned in position, a pulling force imposed on the spacer by the rigid cable will be concentrated at the point where the pin contacts the stretchable cable. Failure of the stretchable cable can occur when exposed to a concentrated stress such as this over an extended period of time. Such a situation arises where components are used in the VIM which may creep when exposed to pulling forces for extended periods. Plastics, such as polyvinylchloride and polyurethane, tend to creep and change position in such a situation. However, such materials are preferred in a VIM due to their vibration energy damping qualities and their inertness to typical buoyancy fill fluids. The invention presents a solution to the above problem.

In accordance with the invention, the spacer is "soft mounted" to the stretchable towing cable so that it may move along the stretchable cable by a limited amount to avoid concentrated stresses. The spacer is clamped in position on the cable by a limited amount of clamping force so that it may move along the stretched cable when subjected to a force which is greater than the clamping force. In one embodiment, two sleeves having certain inside diameters are positioned on the stretchable cable on either side of the spacer after the cable cross section has decreased due to being stretched by a predetermined amount. The sleeves are positioned so as to abut both sides of the spacer thereby holding it in position between them. Clamps such as swage rings are then used to clamp the sleeves in position with a limited amount of clamping force to the stretchable cable. The swage rings provide compressive clamping force to clamp the sleeves to the stretchable cable thereby holding the spacer between the sleeves in a fixed position. Thus, the spacer is held in position until longitudinal forces on it exceed the clamping force, and/or until the cross section of the stretchable cable decreases to a predetermined amount thereby reducing the effectiveness of the swage rings in clamping the sleeves to the cable.

The "soft mounting" in accordance with the invention enables the internal parts of the VIM to adjust their position by a limited amount in response to towing forces exceeding a certain magnitude. The clamping force placed on the stretchable cable by the clamps is limited and is distributed around the cable rather than through it. Since the VIM is constructed of different materials which react differently to extended towing forces, stresses may build up between parts which are in contact. The invention provides for dissipation of these stresses by allowing limited relative movement between parts.

BRIEF DESCRIPTION OF THE DRAWINGS

The various features and advantages of the invention may be more readily understood with reference to the following detailed description taken in conjunction with the accompanying drawings in which.

DETAILED DESCRIPTION OF THE INVENTION

Figure 1:
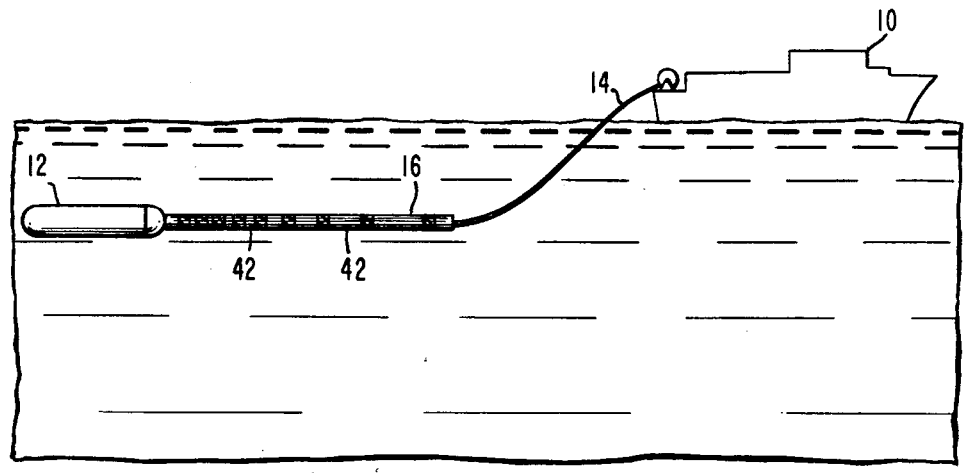
FIG. 1 is a schematic type view of the invention in an operational environment.

Referring now to the drawings with more particularity wherein like reference numerals designate like or corresponding elements among the several views, there is shown in FIG. 1 an operational application of a vibration isolation module (VIM). Surface vessel 10 is towing an array 12 which is sensitive to accoustic energy. Array 12 is submerged to a particular depth and is oriented substantially horizontally in the body of water. An array towing cable 14 from the surface vessel 10 is typically made of a high strength material such as steel and remains in contact with the vessel 10. Between the array towing cable 14 and the array 12 is a VIM 16 in accordance with the invention. As discussed previously, towing noises may be in the frequency range to which the array 12 is sensitive and may mask signals which the array 12 is provided to detect. Thus a means of attenuating such noises would be beneficial to the operation of the array 12. The VIM 16 in accordance with the invention has as a purpose the attenuation of vibration energy which may exist on the towing line between the array 12 and the vessel 10. Stated differently, the VIM 16 is to isolate or decouple the sensitive array 12 from vibration energy which may be transmitted to it by way of the necessary towing mechanism, i.e., its towing line. Depending on the severity of the vibration energy on the towing line, more than one VIM 16 may be required to achieve sufficient attenuation. A single VIM 16 is shown in FIG. 1. As used herein, the "array towing cable" will refer to the cable 14 in contact with the towing vessel 10 while the "towing line" will refer to the complete line from the towing vessel 10 to the array 12 which in FIG. 1, will include the vessel towing cable 14 and the VIM 16.

Figure 2:
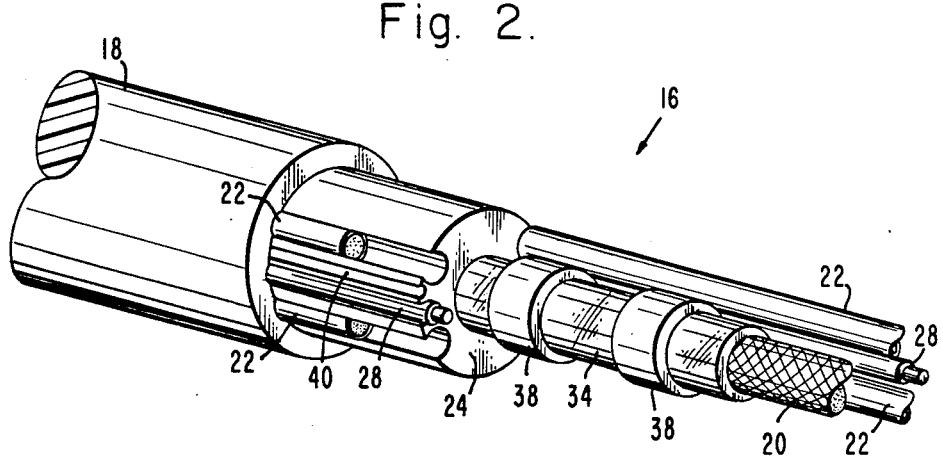
FIG. 2 is a partial cutaway view of a vibration isolation module constructed in accordance with the invention showing the mounting of a spacer and sleeve with swage clamps on the stretchable cable.
Figure 4:
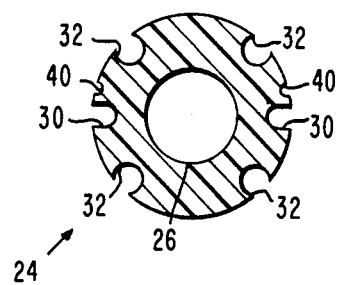
FIG. 4 is a cross section end-on view of a spacer in accordance with the invention.
Figure 3:
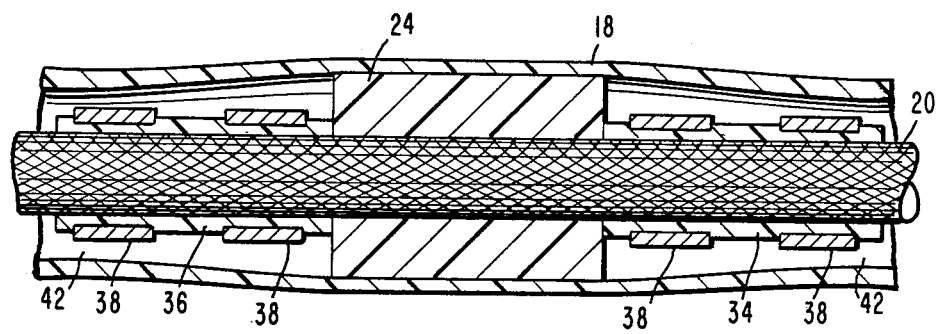
FIG. 3 is a partial cross-sectional side view of a part of a vibration isolation module in accordance with the invention.

Different partial views of a VIM 16 in accordance with the invention are shown in FIGS. 2, 3 and 4. In FIG. 2, a cutaway perspective view of a VIM 16 is presented having an outer hose 18, a stretchable cable 20, rigid cables 22 and a spacer 24. The stretchable cable 20 is to be the primary load bearing member due to its vibration energy dissipation capability. Its ability to stretch allows it to act as a shock absorber, thus reducing the amount of vibration energy from reaching the array 12 along the towing line. A suitable material for the stretchable cable 20 is nylon, such as an 8 mm (5/16 inch) diameter nylon braid (6/6 nylon) sold as Purstron by the Samson Cordage Works, Boston, Mass. 02210.

In the event that the stretchable cable 20 should fail or be stretched by a predetermined amount such as due to towing stresses when the towing vessel 10 speeds up far beyond the normal towing speed, rigid cables 22 are provided which will bear the towed load. These rigid cables 22 are connected between the vessel towing cable 14 and the towed array 12. A suitable material for the rigid towing cables 22 is Kevlar Aramid braided fiber having a breaking strength exceeding any anticipated towing stresses so that the towed object will not be lost.

As is shown in FIGS. 2 and 3, the spacer 24 is in contact with the inner wall of an outer hose 18. The outer hose 18 fully encloses the spacer 24, the stretchable cable 20, and the rigid cables 22 in the longitudinal direction.

The outer hose 18 encloses the VIM 16 longitudinally, is flexible so that it can withstand reeling and storage, is stretchable so that it can stretch along with the stretchable cable 20, and is inert to buoyancy fill fluid. A material usable for the outer hose 18 is polyurethane available from the Upjohn Co., CPR Division, 555 Alaska Avenue, Torrance, Ca. 90503, having a part number of C2103. The wall thickness of the outer hose 18 is selected to result in a desired vibration attenuation characteristic. A thickness of 1.9 to 2.2 mm (0.075 to 0.085 inches) was found to be usable in one embodiment.

The spacer 24 is in contact with the outer hose 18, the stretchable cable 20, and the rigid cables 22. The spacer 24 is formed of a rigid material such as a polyvinyl chloride and is mounted on the primary load bearing cable, i.e., the stretchable cable 20. It has as much contact and gripping power with the outer hose 18 as possible without creating a high stress/abrasion point. A hole 26 is formed through the spacer 24 as shown in FIG. 4, through which the stretchable cable 20 is disposed. Rather than hard mounting the spacer 24 to the stretchable cable 20 such as by the prior technique of driving a pin through both, in accordance with the invention, the spacer 24 is soft mounted. The spacer 24, in addition to spacing the outer hose 18 and the cables 20 and 22 apart, functions as an energy transmission device. As shown in FIGS. 2 and 3, the spacer 24 contacts the stretchable cable 20 and the inner wall of the outer hose 18. The spacer 24 will transmit vibration energy from the stretchable cable 20, such as vibration transmitted along the stretchable cable from the towing vessel 10, to the outer hose 18 for dissipation. Likewise, the spacer 24 will transmit vibration energy existing on the outer hose 18, such as that caused by water flow noise, to the stretchable cable 20 for dissipation.

As is shown in FIG. 2, the spacer 24 also guides the rigid cables 22 and the electrical cables 28 which traverse the VIM 16. As shown in FIG. 2, there are two electrical cables 28 mounted diametrically opposed in the spacer 24. Two electrical cables 28 and four rigid cables 22 are shown; however, more or less may be provided as the application dictates. FIG. 4 shows a cross-sectional view of a spacer 24. There are two sets of notches or channels, the first set consists in this embodiment of two like channels 30 and the second set consists in this embodiment of four like channels 32. The first set of two like channels 30 is used for the support and positioning of the electrical cables 28 (FIG. 2) and the second set of four like channels 32 is used for the support and positioning of the rigid cables 22. The rigid cables 22 and the electrical cables 28 are secured in these notches in one embodiment by an adhesive, such as a polyurethane structural adhesive available from the 3M Company, Aerospace Sales, AC&S Division, 6411 Randolph Street, Los Angeles, Ca. 90040. It should be noted that the electrical and rigid cables 28, 22, respectively, should be mounted in the VIM 16 in such a way and with enough slack so that they do not interfere with the stretching operation of the VIM 16 and with each other. One method for initially mounting comprises doubling back the cables enough times as necessary so that they fit between the spacers and using temporary ties to hold them in position.

In accordance with the invention, the spacer 24 is restrained in position on the stretchable cable 20 by a soft mounting means such that it remains in that position until the stretchable cable 20 has been stretched thereby causing its cross-sectional size to decrease by a certain amount, and/or the spacer 24 is subjected to a longitudinal force or "breakaway" force in excess of a predetermined amount. The breakaway force is typically determined by thge aplication of the VIM. Operational towing speed, VIM cross-sectional size and other factors are considered. Then the spacer 24 may move along the stretchable cable 20 by a certain limited amount without degradation of either the stretchable cable 20 or the spacer 24. Since the operational towing speed of the sensor array is known and the amount of drag that the towed array 12 presents can be determined, then the cross-sectional size of the selected stretchable cable 20 under such an operating load can also be determined. This facilitates the determination of the amount of clamping force of the spacer 24 to the stretchable cable 20 so that the spacer 24 will remain stationary relative to the cable until exposed to the breakaway force. In one embodiment, it was found that a breakaway force within the range of 100 to 200 pounds was usable. In another embodiment, a breakaway force of 150 pounds worked satisfactorily.

In an embodiment of a soft mounting means in accordance with the invention as shown in FIGS. 2 and 3, the spacer 24 is mounted in position between two sleeves 34, 36 which are also mounted on the stretchable cable 20. These sleeves 34, 36 abut the spacer at its ends and then are clamped to the stretchable cable 20 by clamping means such as swage rings 38. The sleeves 34, 36 are formed of a flexible material such as polyurethane which is inert to buoyancy fill fluid. The swage rings 38 are formed of a material selected for the particular environment. Where the swage rings 38 may be exposed to sea water, the rings 38 may be formed of a malleable, corrosion resistive steel, such as 321 steel. Where corrosion due to sea water exposure is not a concern, the swage rings 38 may be formed of aluminum.

In forming a VIM in accordance with the above, the stretchable cable 20 is stretched by the amount it would experience under the optimal towing speed. Then the sleeves 34, 36 and the spacer 24 with the sleeves abutting the spacer on either end are installed on the cable 20. Once the sleeves 34, 36 are installed and while the cable 20 is still stretched, the clamps, such as swage rings 38, are applied to the sleeves 34, 36 to apply the limited amount of compressive or clamping force to the stretchable cable 20 to hold the abutting sleeves 34, 36 in position thereby holding the spacer 24 in position. As discussed above, the clamping force is limited to allow movement of the spacer 24 in response to a longitudinal force exceeding a predetermined amount. The above technique for positioning the spacer 24 and applying the clamping force to the sleeves while the cable 20 is stretched permits accuracy in the placement of the spacer 24 and accuracy in obtaining the correct breakaway force for the spacer 24 and the sleeves 34, 36. However, other methods may be used, such as forming the hole in the spacer 24 with a cross-sectional size larger than the unstretched cable 20 while forming the holes in the sleeves 34, 36 with a cross-sectional size smaller than that of the unstretched cable 20 but larger than that of the cable 20 stretched at its optimal towing configuration. In this method, the spacer 24 and sleeves 34, 36 may be positioned when the cable 20 is stretched, but the sleeves are clamped after the cable 20 has been returned to an unstretched condition. Although potentially not as accurate as clamping the sleeves 34, 36 while the cable is stretched, acceptable results may nevertheless be obtained.

A method of constructing the VIM in accordance with the invention comprises positioning the sleeves and spacers on the stretchable cable 20 before it is stretched and then stretching it by an amount equal to the stretching it would receive when in operation. In order to assemble the sleeves 34, 36 and spacer 24 onto the stretchable cable 20 prior to stretching, part of the cross section of the cable 20 at one end is removed and the sleeves and spacer installed in that area prior to stretching. With the nylon braided rope previously mentioned for use as the stretchable cable 20, the inner braid may be removed thereby reducing the cross section. The sleeves and spacers are then slid onto this part of the cable 20, which is then stretched thereby causing the cross section of the intact part of the rope to decrease to smaller than the holes through the sleeves and spacer. A stretching force of 140 pounds was used in one embodiment. The sleeves and spacers are then correctly positioned onto the stretched cable 20 and the spacers clamped in place.

After clamping the sleeves in place, the rigid cables and electrical wiring are added. They are inserted in the appropriate notches in the spacer as shown in FIG. 2 and held in position by adhesive. For an accuracy check, the stretchable cable may then once again be stretched, this time by an amount sufficient to allow the rigid cables to bear the load. This verifies that there is adequate slack in the wires. In one embodiment, a stretching force of 2,000 pounds was used.

The stretchable cable is then relaxed and the slack of the rigid and electrical cables is folded between the spacers, such as by doubling a plurality of times and the folds tied by temporary ties. The outer hose 18 is then positioned over the whole assembly. After positioning the outer hose 18, the assembled VIM 16 is again stretched to correctly position all the components, to release any temporary ties used, to relieve any binding of electrical wires, stretchable cable and rigid cables, and to check the structural and electrical integrity of the assembly under load. In one embodiment, the force used to stretch the assembled VIM was 4,500 pounds. During stretching, buoyancy fluid is added inside the hose and is pressurized enough to assure even distribution throughout the VIM and to increase the internal size of the hose to facilitate the stretching and movement of the wires, rigid cables, and stretchable cable. The pressurization may then be dissipated.

Another embodiment of the invention comprises making the hole through the spacer 24 a selected size so that the correct pressure between it and the stretchable cable 24 is obtained. In particular, the hole in the spacer 24 is made somewhat smaller in cross section than the cross-sectional size of the "necked-down" stretchable cable 20 when at the optimal towing speed. The spacer 24 hole size is small enough so that a breakaway force of between 100-200 pounds is required in one embodiment to move the spacer along the stretched cable 20.

A typical requirement of a VIM 16 is that it deploy substantially horizontally in the water. This is achieved by filling the VIM with a controlled buoyancy fluid which results in the VIM having a neutral buoyancy. Typically, a positive buoyancy fluid is required. As shown in FIGS. 2 and 4, there are grooves along the spacer which permit fluid to flow from one side of the spacer to the other. Typically, a plurality of spacers are employed in a VIM and there are areas or longitudinal cavities 42 between the spacers 24 in which the neutral buoyancy fluid may be inserted as shown in FIGS. 1 and 3. Also, certain buoyancy fill fluids will lubricate the Kevlar Aramid strands so that the possibility of failure of the rigid cables 22 due to rubbing against themselves or other components is reduced. A neutral buoyancy fluid found to be useful is Isopar L by the Exxon Corporation, P.0. Box 2180, Houston, Tx. 77001.

Thus, there has been shown and described in detail a new and useful vibration isolation module for towed arrays. Although the invention has been described and illustrated in detail, this is by way of example only and is not meant to be taken by way of limitation. Modifications to the above description and illustrations of the invention may occur to those skilled in the art, however, it is the intention that the scope of the invention should include such modifications unless specifically limited by the claims.

What is claimed is:

1. A vibration isolation module comprising:
   a hose of flexible material;
   a stretchable cable longitudinally disposed within the hose, formed of a material which decreases in cross section when stretched;
   a spacer having two ends and being formed of a rigid material slidably mounted on the cable and in contact with the inner surface of the hose; and
   means for holding the spacer in a particular position on the cable in a way such that movement of the spacer along the cable is restrained until the cable cross section decreases to a predetermined size and the spacer is subjected to a longitudinal force in excess of a predetermined magnitude whereupon the spacer may move along the cable.

2. The vibration isolation module of claim 1 wherein the means for holding comprises:
   first means for abutting the two ends of the spacer; and
   second means for clamping the first means to the cable with a predetermined clamping force such that the first means and the spacer are held in particular positions in relation to the cable until the cable cross section decreases to the predetermined size and the spacer is subjected to the longitudinal force in excess of the predetermined magnitude whereupon the spacer may move along the cable.

3. The vibration isolation module of claim 2 wherein the first means comprises first and second sleeves slidably mounted on the cable at opposite ends of the spacer and abutting the spacer at its ends.

4. The vibration isolation module of claim 2 wherein the second means comprises first and second swage rings applied so as to clamp the first means to the cable with the predetermined clamping force thereby holding the spacer between the clamped first means.

5. The vibration isolation module of claim 1 wherein the means for holding comprises forming a hole in the spacer through which the cable is disposed, the hole having a cross-sectional size selected so that it restrains movement of the spacer along the cable until the cable cross section decreases to the predetermined size and the spacer is subjected to the longitudinal force in excess of the predetermined magnitude whereupon the spacer may move along the cable.

6. The vibration isolation module of claim 3 wherein the first and second sleeves have holes through which the cable is disposed, the holes having a cross-sectional size which is less than the cross-sectional size of the unstretched cable, the first and second sleeves being positioned on the cable while the cable is being stretched by a predetermined amount.

7. The vibration isolation module of claim 6 wherein the second means is applied to the first and second sleeves to clamp them to the cable after they have been positioned thereon and when the cable is in a substantially unstretched condition.

8. The vibration isolation module of claim 7 wherein the second means comprises first and second swage rings applied to the first and second sleeves so as to clamp the first and second sleeves respectively to the cable with the predetermined clamping force.

9. The vibration isolation module of claim 6 wherein the second means is applied to the first and second sleeves to clamp them to the cable after they have been positioned thereon and while the cable is being stretched by a predetermined amount.

10. The vibration isolation module of claim 9 wherein the second means comprises first and second swage rings applied to the first and second sleeves so as to clamp the first and second sleeves respectively to the cable with the predetermined clamping force.

11. The vibration isolation module of claim 10 wherein the swage rings clamp the sleeves to the cable with a force such that the sleeves and spacer may move along the cable when the cable cross section decreases to the predetermined size and when the longitudinal force on the spacer is within the approximate range of 100 to 200 pounds.

12. The vibration isolation module of claim 10 wherein the swage rings clamp the sleeves to the cable with a force such that the sleeves and spacer may move along the cable when the cable cross section decreases to the predetermined size and when the longitudinal force on the spacer is within the approximate range of 50 to 100 pounds.

13. The vibration isolation module of claim 5 wherein the size of the hole in the spacer is selected so that the spacer may move along the cable when subjected to a longitudinal force in the approximate range of 100 to 200 pounds.

14. A vibration isolation module comprising:
a hose of flexible material;
a stretchable cable longitudinally disposed within the hose, formed of a material which decreases in cross section when stretched;
a spacer having two ends formed of a rigid material slidably mounted on the cable and in contact with the inner surface of the hose;
first and second sleeves slidably mounted on the cable, one at each end of the spacer and abutting the spacer; and
means for clamping the sleeves to the cable with a predetermined clamping force such that the sleeves and the spacer are held in particular positions in relation to the cable until the cable cross section decreases to a predetermined size and the spacer is subjected to a longitudinal force in excess of a predetermined magnitude whereupon the spacer may move along the cable.

15. The vibration isolation module of claim 14 wherein the first and second sleeves have holes through which the cable is disposed, the holes having a cross-sectional size which is less than the cross-sectional size of the unstretched cable, the first and second sleeves being positioned on the cable while the cable is being stretched by a predetermined amount.

16. The vibration isolation module of claim 15 wherein the means for clamping the first and second sleeves to the cable is applied after the sleeves have been positioned on the cable and when the cable is in a substantially unstretched condition.

17. The vibration isolation module of claim 16 wherein the means for clamping comprises first and second swage rings applied to the first and second sleeves so as to clamp the first and second sleeves respectively to the cable with the predetermined clamping force.

18. The vibration isolation module of claim 15 wherein the means for clamping is applied to the first and second sleeves to clamp them to the cable after they have been positioned thereon and while the cable is being stretched by the predetermined amount.

19. The vibration isolation module of claim 18 wherein the means for clamping comprises first and second swage rings applied to the first and second sleeves so as to clamp the first and second sleeves respectively to the cable with the predetermined clamping force.

20. The vibration isolation module of claim 19 wherein the swage rings clamp the sleeves to the cable with a force such that the sleeves and spacer may move along the cable when the cable cross section decreases to the predetermined size and when the longitudinal force on the spacer is within the approximate range of 100 to 200 pounds.

21. The vibration isolation module of claim 19 wherein the swage rings clamp the sleeves to the cable with a force such that the sleeves and spacer may move along the cable when the cable cross section decreases to the predetermined size and when the longitudinal force on the spacer is within the approximate range of 50 to 100 pounds.

22. A process for forming a vibration isolation module comprising the steps of:
providing a stretchable cable formed of a material which decreases in cross section when stretched;
removing a selected amount of material from the cable along a selected length thereof, whereby the cross section of the cable along the selected length is decreased;
providing a spacer having two ends and being formed of a rigid material and having a hole formed therethrough;
providing first and second sleeves having longitudinal holes formed through each, the holes being of a cross-sectional size smaller than the unstretched cable but larger than the cross-sectional size of the cable along the selected length;
slidably mounting the spacer and the sleeves on the selected length of cable such that the spacer is between the sleeves;
stretching the cable by a predetermined amount so that the cross section is less than that of the holes through the sleeves;
slidably positioning the spacer and sleeves on the cable such that the sleeves are abutting the spacer at both ends thereof;
clamping the sleeves to the cable with a clamping force such that the spacer and sleeves are held in a stationary position on the cable but may be moved along the cable upon being subjected to a longitudinal force exceeding a predetermined amount; and
enclosing the cable, spacer, and sleeves with a hose of a flexible material and of a size selected so that its inner surface is in contact with the spacer.

23. The process of claim 22 wherein the step of clamping the sleeves to the cable comprises using a clamping force selected so that the spacer and sleeves may be moved along the cable by a breakaway force in the approximate range of 100 to 200 pounds.

24. The process of claim 22 wherein the step of clamping the sleeves to the cable comprises using a clamping force selected so that the spacer and sleeves may be moved along the cable by a breakaway force in the approximate range of 50 to 100 pounds.

25. The process of claim 22 further comprising the step of relaxing the cable to a substantially unstretched condition after the step of slidably positioning the spacer and sleeves on the cable and before the step of clamping the sleeves.

* * * * *